United States Patent  [15] 3,669,848
Seiden  [45] June 13, 1972

[54] PURIFYING PROPYLENE GLYCOL MONOESTERS USING VACUUM DISTILLATION

[72] Inventor: Paul Seiden, Cincinnati, Ohio
[73] Assignee: The Proctor & Gamble Company, Cincinnati, Ohio
[22] Filed: Dec. 19, 1969
[21] Appl. No.: 886,772

[52] U.S. Cl. ..............................203/94, 260/484 R, 99/118
[51] Int. Cl. ............................................................B01d 3/10
[58] Field of Search.......................99/49, 80, 90, 91, 92, 94, 99/123, 124, 144, 118; 203/25, 49, 80, 91–94, 4; 260/210, 234, 410.6, 428, 494, 484 R

[56] References Cited

UNITED STATES PATENTS

| | | | |
|---|---|---|---|
| 2,924,528 | 2/1960 | Barsky et al. | 260/410.6 |
| 3,145,108 | 8/1964 | Bratton | 99/118 |
| 3,268,337 | 8/1966 | Howard et al. | 99/94 X |
| 3,383,217 | 5/1968 | Meade et al. | 99/92 X |

FOREIGN PATENTS OR APPLICATIONS

| | | | |
|---|---|---|---|
| 421,284 | 1934 | Great Britain | 260/410.6 |
| 491,370 | 1953 | Canada | 260/410.6 |
| 1,025,238 | 1966 | Great Britain | 260/428 |

OTHER PUBLICATIONS

Journal– Oil– Chemist's Jan. Vol. vol. 36 pp. 34– 36
British Chemical Patent Journal (6–4–66) Vol. 6 No. 18 Gen. Organic p. 5.
Bailey's Ind. Oil and Fat–Products 3rd Ed. pp. 1019 thru 1027 (1964)
Food Processing Review No. 5 by Dr. N. E. Bednarcyk p. 253 (1969) Edible Oils and Fats.

*Primary Examiner*—Norman Yudkoff
*Assistant Examiner*—Kenneth Van Wyck
*Attorney*—Edmund J. Sease

[57] ABSTRACT

A method of purifying propylene glycol monoester emulsifiers utilizing non-molecular vacuum distillation.

10 Claims, No Drawings

PURIFYING PROPYLENE GLYCOL MONOESTERS USING VACUUM DISTILLATION

BACKGROUND OF THE INVENTION

Propylene glycol monoesters are important compounds in food processing technology. The primary utility of these compounds is as effective emulsifiers to provide desirable properties to shortenings — including clear oil shortenings, culinary mixes, whipped toppings, frostings, fillings, and other foods and food ingredients.

One of the principal utilities of propylene glycol monoesters is their utilization in shortening ingredients to be utilized in culinary mixes to provide highly desirable cake properties in the resultant baked products. In the baking of culinary mixes, one of the major problems concerns the incorporation of air into the batter in the form of small bubbles. The incorporation of air is essentially the production of a foam, and the presence of an oily or fatty phase tends to harm the foam-building tendency of the protein fraction of cakes. It is believed that emulsifiers, such as propylene glycol monoesters, prevent the oily phase from acting as a depressant for foaming by forming a film at the oil-aqueous phase interface. The film-forming tendency of emulsifiers is apparently related, at least in part, to the crystalline structure of the emulsifier at the temperature of mixing. The preferred structure is the alpha-crystalline phase structure which, for many emulsifiers, is ordinarily unstable but has been found to be relatively stable in regard to propylene glycol monoesters. Accordingly, propylene glycol monoesters have been utilized successfully as emulsifiers to enhance the air incorporation tendencies of culinary mixes.

Commercially propylene glycol monoesters can be conveniently prepared by either directly esterifying propylene glycol with fatty acid, or more practically, by interesterifying triglyceride with propylene glycol. Direct esterification under practical conditions can be accomplished by reacting propylene glycol, 1,3-propane diol, or propylene oxide with a fatty acid to yield approximately 55 to 60 percent of a propylene glycol monoester product; the balance is a reaction by-product comprising diester and unreacted starting materials. Because of the high cost of fatty acids the direct esterification reaction is not commonly utilized. The most commonly utilized process of making propylene glycol monoesters is by interesterifying triglycerides with propylene glycol. This interesterification reaction is conveniently carried out, for example, at temperatures ranging from 350° to 450° F with the use of a catalyst such as sodium hydroxide. The product resulting from the interesterification reaction ordinarily is a crude product, and contains monoglyceride, diglyceride, triglyceride, propylene glycol diester, and free fatty acid in addition to the monoester of propylene glycol. This reaction is referred to in the art as "superglycolation" and yields two effective emulsifiers, i.e., propylene glycol monoesters and monoglycerides. However, residual triglyceride and especially propylene glycol diester by-product of the superglycolation reaction are not beneficial as emulsifiers. In fact, propylene glycol diesters have been found to detrimentally affect the emulsifying properties of the monoester. In the superglycolation reaction the amount of diester obtained is at a high enough percentage to detrimentally affect the emulsifying properties of the monoester. To be more specific, practical superglycolation generally provides products within the following ranges: propylene glycol monoester — 60 to 65 percent, propylene glycol diester — 5 to 10 percent, monoglyceride — 10 to 15 percent, diglyceride — 5 to 9 percent, triglyceride — 5 to 8 percent, and free fatty acid at a level of from 2 to 3 percent. A diester content as high as 4 percent and specifically at levels of from 5 to 10 percent, as produced in the superglycolation procedure, is very detrimental to the emulsifying properties of propylene glycol monoesters and monoglycerides. Accordingly, to provide the most effective propylene glycol monoesters it is essential that the monoester be separated from the diester as completely as possible. Specifically, if the diester content is in excess of 3 percent, it has been found to be damaging in regard to the emulsifying properties of the propylene glycol monoester.

While the prior art has recognized the disadvantages of high propylene glycol diester contents, heretofore no successful method of purifying propylene glycol monoesters such that they have less than 3 percent propylene glycol diester present has been found. Swicklik, Canadian Pat. No. 760,450, discloses a process of making and purifying propylene glycol monoesters. However, the Swicklik patent utilizes a molecular distillation procedure which reduces the level of diesters to from about 4 to about 8 percent. As previously mentioned, such a level of propylene glycol diester content is undesirable in that at percentages within the Swicklik range the emulsifying properties of the propylene glycol monoesters are reduced.

Accordingly, there is a real need for a method of purifying propylene glycol monoesters such that the level of diester is less than about 3 percent. It is an object of this invention to satisfy that need.

SUMMARY OF THE INVENTION

This invention relates to a method of producing propylene glycol monoesters having a diester content of less than 3 percent, said method comprising, non-molecular vacuum distillation of propylene glycol monoester crude product at a temperature of from 170° to 285° C at an absolute pressure of less than 15 mm. of mercury for from 3 hours to 16 hours to provide purified propylene glycol monoester having a diester content of less than 3 percent.

As used herein, the phrase "propylene glycol monoester crude product" is intended to refer to the product of superglycolation of a triglyceride, and to the product of direct esterification utilizing propylene glycol and a free fatty acid. These products are referred to as crude products because of the above-referred-to mixtures of compounds present therein.

DETAILED DESCRIPTION OF THE INVENTION

The term "propylene glycol monoester" as used herein refers to the monoester reaction product of a carboxylic acid having from 14 to 22 carbon atoms and a propane diol such as propylene glycol or propylene oxide. It includes saturated and unsaturated $C_{14}$–$C_{22}$ carboxylic acids as well as straight and branched chain monobasic and polybasic carboxylic acids.

The $C_{14}$–$C_{22}$ carboxylic acids are derived from naturally occurring fats and oils which have been refined, bleached, and preferably hydrogenated. These oils are commercially available and are utilized in the superglycolation procedure of making propylene glycol monoesters. Examples of such naturally occurring fats and oils are cottonseed oil, menhaden oil, soybean oil, safflower seed oil, rapeseed oil, palm oil, herring oil and tallow and lard.

As previously mentioned herein, the emulsifying properties of propylene glycol monoesters have been found to be directly dependent upon the purity of the propylene glycol monoesters. More specifically, if the propylene glycol diester content of the emulsifying mixture is greater than 3 percent, the ability of the propylene glycol monoesters to function as effective emulsifiers, especially in culinary mix systems, has been found to be greatly reduced. Heretofore a practical method of effectively separating propylene glycol monoesters from propylene glycol diester by-product at a level of less than 3 percent has not been known. Propylene glycol monoesters and diesters are very difficult to separate because they have vapor pressures very close to the vapor pressures of other by-products of the reaction ingredients, and also because at high temperatures needed to effect a separation, these compounds often decompose.

One attempt to produce high purity propylene glycol monoesters is shown in the previously cited Swicklik patent. In the Swicklik patent crude propylene glycol monoester products are molecularly distilled to effect separation. The resulting product is from 90–93 percent pure propylene glycol monoester, and contains propylene glycol diesters at a level ranging from about 4 percent to about 8 percent. Thus the Swicklik molecular distillation method is not effective in producing a propylene glycol monoester product having less than 3 percent diester contained therein.

It is important to note that the Swicklik process of purification involves *molecular* distillation. Molecular distillation means that the condenser for the distillation apparatus is placed within the mean free path of the emerging vapor molecules. This means that evaporating molecules are likely to escape permanently from the distilland on their first conversion to gaseous phase. Because nearly all of the gaseous molecules escape from the distilling vessel upon their first entrance into the gaseous phase, molecular distillation involves little or no internal refluxing, i.e. continual evaporation and condensation of the molecules prior to final escape from the distilling vessel. In fact, in most cases it has been found that molecular distillation involves only a unit act of distillation. The principal advantage of molecular distillation is that it allows distillation at the lowest possible theoretical temperature, and since no internal refluxing takes place, the distillation procedure can be completed in a fairly rapid time. As a result of molecular distillation, the distilling mixture is subjected to high temperatures for the least possible theoretical time.

Molecular distillation is to be distinguished from non-molecular vacuum distillation in which the condenser is placed at a distance greater than the mean free path of vapor molecules. This means that in normal, non-molecular vacuum distillation, each gaseous molecule will condense and fall into the distilland many times prior to its actual escape from the distilling mixture. In fact, in normal non-molecular vacuum distillation it has been shown that each molecule may undergo internal refluxing for a period of time sufficient that each individual molecule goes from liquid phase to gaseous phase as many as 1,000 times prior to actual escape from the distilling vessel. Accordingly, non-molecular vacuum distillation has to be conducted for longer periods of time to effect separation and at higher temperatures in order to insure escape of the gaseous molecules from the distilling mixture.

Heretofore, it was thought that non-molecular vacuum distillation of propylene glycol monoesters could not be accomplished because the high temperatures needed would decompose the propylene glycol monoesters. It has been surprisingly discovered that non-molecular vacuum distillation of propylene glycol monoester crude products can be accomplished to provide a propylene glycol diester content of less than 3 percent provided a critical range of pressures and temperatures are employed.

It is essential to the non-molecular vacuum distillation process of this invention that the distillation be conducted at a temperature ranging from 170° to 285° C. If the distillation temperature is in excess of 285° C, rapid decomposition of the propylene glycol monoesters contained in the crude reaction product begins to occur. On the other hand, if the temperature is less than 170° C, it has been found that while distillation may occur, the level of propylene glycol diester is not reduced to less than about 3 percent.

Certain temperature ranges within the above broader temperature range for the non-molecular vacuum distillation procedure of this invention have been found to be especially preferred for particular propylene glycol monoester distillations. More specifically, for propylene glycol monopalmitate the temperature range should preferably be from 180° to 230° C; for propylene glycol monomyristate, the preferred temperature range is 170° to 220° C; for propylene glycol monostearate the preferred temperature range is 190° to 250° C; for propylene glycol monobehenate, the preferred temperature range is 200° to 260° C; and for propylene glycol monobrassidate, the preferred temperature range is 200° to 260° C.

Utilization of non-molecular vacuum distillation temperatures within the above broader range and within the narrower preferred ranges for each of the specifically mentioned $C_{14}$–$C_{22}$ monoesters of propylene glycol has been found to provide effective separation such that the level of the corresponding propylene glycol diester is reduced to below 3 percent.

It is essential to the non-molecular vacuum distillation procedure of this invention that the distillation be conducted at an absolute pressure of less than 15 mm. of mercury, and preferably, at an absolute pressure of less than 10 mm. of mercury. If the distillation is conducted at an absolute pressure in excess of 15 mm. mercury, the temperature needed to effect separation such that the diester content is greater than 3 percent is greater than 260° C, and therefore rapid decomposition of the corresponding propylene glycol monoester occurs. Most effective separation has been found to occur when the absolute pressure is less than 10 mm. of mercury. No critical lower pressure limitation exists and generally it can be said that a practical lower limitation is the limitation of the system used to impart the vacuum. For example, when a vacuum pump is utilized it is nearly impossible to obtain, on a plant scale operation, a vacuum of less than 1 mm. Likewise, when the method of creating a vacuum is multi-stage steam ejectors, a practical lower limitation on the vacuum is an absolute pressure of 1 mm. of mercury.

While not essential to the non-molecular vacuum distillation procedure of this invention, it is preferred that the distillation be conducted for a time of from 3 hours to 16 hours. If distillation times of less than 3 hours are employed, the time is generally insufficient to provide a practical yield of purified propylene glycol monoester having a propylene glycol diester content of less than 3 percent. On the other hand, if the total distillation time is in excess of 16 hours it has been found that the tendency for rapid decomposition substantially increases and therefore the level of propylene glycol monoester obtained is substantially reduced. Especially preferred time limitations are within the range of from 3 hours to 7 hours. Times within the most preferred range have been found to provide a practical time limitation for distillation which provides the highest yields of propylene glycol monoester coupled with a diester content of less than 3 percent.

The above preferred and most preferred time ranges are given with special reference to batch distillation. However, it should be noted that it is conceivable that the non-molecular vacuum distillation process of this invention can be conducted in a continuous manner using substantially reduced times, i.e. practical continuous distillation times may be from 5 minutes to 30 minutes.

While not essential to the process of this invention, it is preferred that non-molecular vacuum distillation be conducted while continuously flushing the distilling vessel with an inert gas such as steam, carbon dioxide, argon, or nitrogen. This continuous flushing method is referred to in the distilling art as sparging or stripping. Inert gas sparging is preferred because it allows the distilling times and temperature to be at the lower ends of the ranges given herein and yet effective separation and a low level of diester are obtained. As an additional benefit, utilizing the lower ends of the time-temperature ranges minimizes thermal decomposition of the desired monoesters.

As hereinbefore briefly mentioned, one of the principal utilities of propylene glycol monoesters is their utilization as emulsifiers in the shortening ingredient of culinary mix compositions. It has been found that when propylene glycol monoesters having a diester content of less than 3 percent are utilized as an emulsifier in the shortening ingredient of a cake mix composition, the resulting baked cake is softer, more moist, and generally better in eating quality as well as often having an increased volume. On the other hand, when the propylene glycol diester content of the emulsifier for the shortening ingredient of a cake mix composition is in excess of 3 percent, the cake becomes tough, dry and increasingly poor in eating quality and often is found to have a decreased volume. These differences can be seen from the following comparative test.

Two yellow cakes, Cakes 1 and 2, identical in formulation except in regard to the emulsifier are prepared. Cake 1 utilizes non-molecular vacuum distilled propylene glycol monoester (the monoester is stearate) having a diester content of less than 3% as the emulsifier for the shortening ingredient. Cake 2 utilizes a propylene glycol monostearate emulsifier system having a diester content of 5 percent. The yellow cake formulation has the following weight basis percentage of ingredients:

| Ingredient | % |
| --- | --- |
| Sugar | 38.875 |
| Flour (soft wheat cake flour) | 44.19 |
| Shortening[1] [2] | 11.00 |
| Soda | 1.25 |
| Non-fat dried milk solids | 1.00 |
| Potato starch | 1.00 |
| Carboxy methyl cellulose | 0.20 |
| Salt | 0.90 |
| Sodium aluminum phosphate | 1.10 |
| Flavor | 0.35 |
| Yellow dye | 0.12 |
| Red dye | 0.015 |

[1]The breakdown for the total shortening content of the Cake 1 formulation is as follows:
8.8% tallow fat and vegetable oil shortening which has been refined, bleached and deodorized and has an iodine value of about 52.
1.76% of the non-molecular vacuum distilled reaction product of hardened soybean oil and propylene glycol. The distillation was conducted at 235°C, an absolute pressure of 8 mm. of mercury, and a condensing temperature of 30°C. The distilled product comprised 94% propylene glycol monostearate, 5% glycerol monostearate, and 1% propylene glycol distearate.
.44% of the reaction product of hardened rapeseed oil and glycerine which comprises 37% monoglyceride and 35% diglyceride, and 28% triglyceride.
[2]The breakdown for the total shortening content of Cake 2 is substantially the same as that given in footnote 1 except that the emulsifier mixture was not vacuum distilled in accord with the process of this invention, and comprises the reaction product of hardened soybean oil and propylene glycol. Specifically, the breakdown of the shortening composition is as follows: 8.8% tallow fat and vegetable oil shortening which has been refined, bleached and deodorized and has an iodine value of about 52.
1.76% of the reaction product of hardened soybean oil and propylene glycol. The reaction product comprised 65% propylene glycol monostearate which is an alpha-phase crystal-tending emulsifier, and 3% free stearic acid which is a high temperature batter stabilizer, and 12% glycerol monostearate, and 18% of a mixture of diglycerides and triglyceride, and 5% of propylene glycol distearate.
.44 % of the reaction product of hardened rapeseed oil and glycerine which comprises 37% monoglyceride and 35% diglyceride, and 28% triglyceride.

With regard to each formulation, batter is made by adding 2 eggs and 320 grams of water to 540 grams of the dry mix. The total batter and water and egg weight is 920 grams. The batter is mixed on a conventional household mixer for 3 minutes at high speed (875 rpm), and for 1 minute at medium speed (500 rpm). Two 9-inch round cake pans are each filled with the respective portions of batter and then baked at 350° F for 32 minutes. After cooling, Cakes 1 and 2 are examined and tasted by a panel of experts. Cake 1, containing non-molecular vacuum distilled propylene glycol monostearate having a distearate content of less than 3 percent, is noted to be superior in cake eating quality, superior in moistness, and of good structure and appearance. Cake 2, which contains a diester content of 5 percent and utilized a propylene glycol monostearate emulsifier not having been non-molecular vacuum distilled, is noted by the panel to be tough and dry, poor in structural quality, and much poorer in eating quality. Each of the members of the panel prefer Cake 1 over Cake 2.

The level of purity of the non-molecular vacuum distilled propylene glycol monoester depends upon whether the monoester was prepared by direct esterification or interesterifying of a triglyceride. With direct esterification the distillate is often 98 to 99.9 percent pure monoester; however, with interesterication the level of purity is somewhat lower because one of the reaction products of interesterification is monoglyceride, for example, glycerol monostearate in the above comparative tests, and it is very difficult and impractical to physically separate monoglyceride from propylene glycol monoester. However, as previously mentioned, monoglycerides also function as desirable emulsifiers and so having monoglyceride present in the purified emulsifier is not harmful.

The composition of distillate when interesterification is used is generally 90–94 percent monoester, 4–9.8 percent monoglyceride and 0.2–2 percent diester. Other by-products such as free fatty acid and excess propylene glycol may be present in amounts of 1 percent or less.

It is important to note that, regardless of the method of preparing propylene glycol monoesters, the process of this invention reduces the content of the detrimental diesters to below 3 percent and usually to below 2 percent.

Prior to addition to a shortening, the purified emulsifier can be deodorized by well-known processes such as are described in Bailey, *Industrial Oil & Fat Products*, 3 ed., Chapter 18, and U.S. Pat. No. 2,674,609.

It should be noted that in the following examples the temperatures are given in ranges rather than precise, specific temperatures. This is so because as is usual in distillation, the temperature is usually controlled within a narrow range and not to a single temperature limit.

The apparatus utilized in the following examples unless specified otherwise is a non-molecular vacuum distillation apparatus comprising a distilling vessel, a jacketed water condenser positioned at a distance greater than the mean-free path of travel of the molecular gas from the distilling vessel, and a condensate receiver. The distilling vessel has an inlet line for inert gas sparging and is evacuated by a multi-stage steam ejector vacuum system. Multi-stage steam ejector vacuum systems are well known and work on the same principle as a conventional laboratory aspirator. The vessel was heated to the desired temperatures specified below, by an electrical heating filament.

It should be further noted that in the examples specific condensing temperatures, i.e. temperatures employed in the condenser of the distilling apparatus, are given in order to provide completeness of data. These temperatures are not critical to the process of this invention as generally any temperature sufficiently low to convert the propylene glycol monoester vapors escaping from the distilling mixture to a liquid phase can be utilized. Of course, the condenser temperature should not be so low as to further convert the liquid phase to the solid phase which would make removal from the condenser very difficult. As a general guideline, satisfactory condensing temperatures are within the range of 4° to 55° C.

The following examples are offered to illustrate the process of this invention:

EXAMPLE 1

In this example, the source of propylene glycol monoester was the crude reaction product of palm oil hydrogenated to an iodine value of 3, and propylene glycol. The reaction was a superglycolation interesterification reaction. The reactor was charged with 25 pounds of palm oil hydrogenated to an iodine value of 24, and with 25 pounds of propylene glycol. Forty-four grams of a 50 percent solution of a sodium hydroxide was added as a reaction catalyst. The superglycolation reaction was conducted at temperatures ranging from 355° to 410° F, and for approximately 2 hours. The pressure employed ranged from 12 to 15 psig. After approximately 2 hours the reaction vessel was allowed to cool to 208° F and 93 grams of phosphoric acid was added to stop the reaction.

Excess propylene glycol was distilled from the reaction mixture at a temperature of 330° F and at an absolute pressure of 30 mm. of mercury.

Analysis of samples of the crude reaction product taken at various intervals during the reaction revealed that the product comprised propylene glycol monostearate, propylene glycol monopalmitate, and propylene glycol monomyristate as well as monoglyceride, diglyceride, triglyceride, and free fatty acid, and of course, propylene glycol diesters. The final sample taken after 100 minutes, when analyzed, showed the presence of 46.9 percent propylene glycol monostearate, 31.8 percent propylene glycol monopalmitate, and 0.8 percent propylene glycol monomyristate. The total amount of propylene glycol monoester present was 79.5 percent. The approximate amount of propylene glycol diester present was 10 percent.

25 pounds of the above-referred-to crude propylene glycol monoester product was utilized in the non-molecular vacuum distillation procedure of this invention. The above-referred-to vacuum distillation apparatus was charged with the above specified amount of crude reaction product. The total distillation time was 7 hours and 15 minutes. During the first 2 hours and 15 minutes the distillation temperature ranged from 199° C at the beginning to 221° C after 2 hours and 15 minutes. The vacuum distillation pressure, absolute, varied between 8 mm. of mercury and 10 mm. of mercury. The condensing temperature was between 40° and 36° C. During the last 5 hours of the distillation procedure, the distilling temperature ranged between 177° and 221° C, the vacuum pressure absolute ranged between 31 mm. of mercury and 8 mm. of mercury, and the condensing temperature ranged between 36° and 34° C. During the entire distillation procedure continuous steam sparging was employed.

The total amount of distillate collected was 2,500 ml. Thin layer paper chromatography analysis of the distillate showed a propylene glycol diester content of 1.0 percent. The monoester content was 93 percent, and the monoglyceride content was 5 percent. Other contaminants, probably propylene glycol and free fatty acid totaled about 1 percent.

EXAMPLE 2

Propylene glycol and brassidic acid were reacted at atmospheric pressure and at 180° C to prepare propylene glycol monobrassidate. This reaction is a direct esterification reaction. The reaction was conducted under a nitrogen blanket. The amount of brassidic acid was 630 grams, the amount of propylene glycol was 750 grams, and 28 grams of para-toluene sulfonic acid was utilized as a catalyst. The reaction time was 2 hours and 40 minutes. The crude reaction product was washed twice with hot water and the aqueous phase was removed. Thereafter the crude product was placed in contact with an additional wash water and allowed to separate naturally. The crude product mixture was decanted and filtered. The crude reaction product comprised propylene glycol monobrassidate, brassidic acid, and propylene glycol. This crude reaction product was utilized in the following non-molecular vacuum distillation procedure.

The apparatus used in this example was a glassware distillation apparatus and the vacuum was maintained by a vacuum pump. Flask heating was accomplished by a heating mantle which was controlled by a power stat. The total distillation time period was 3 hours and 25 minutes. During this time period the temperature, after distillation began, ranged from 243° to 281° C. The vacuum, maintained by the vacuum pump, ranged from 2 mm. absolute to 6 mm. absolute. During the entire distillation procedure the distilling flask was nitrogen sparged.

The condensing temperature was 33° to 36° C and the condenser was placed at a distance from the distilling vessel such that non-molecular vacuum distillation occurred.

Thin layer chromatography analysis of the distilled product revealed that it had a diester content of 2 percent.

EXAMPLE 3

The source of propylene glycol monoester in this Example was the direct esterification reaction between 50 pounds of palmitic acid and 100 pounds of propylene glycol using 40 grams of para-toluene sulfonic acid as a catalyst. The reaction time was 5 hours and the temperature varied from 250° to 403° F. The pressure was within the range of from 5 to 25 psig during the entire reaction procedure. The crude reaction product comprised propylene glycol monopalmitate, palmitic acid, and propylene glycol as well as propylene glycol dipalmitate. This crude reaction product was utilized in the following non-molecular vacuum distillation procedure.

The crude reaction product prepared as described above was charged into the non-molecular vacuum distillation apparatus previously utilized in Example 1. In this non-molecular vacuum distillation procedure, nine fractions were taken from the distilling mixture at various intervals. The distillation procedure was begun at 8 o'clock in the morning and the following table shows the conditions at the time of drawing off of each fraction.

| Time | Distilling temperature (° C.) | Absolute pressure (mm.) | Condensing temperature (° C.) | Fraction | Diester content* (percent) | Monoester* (percent) |
|---|---|---|---|---|---|---|
| 8:45 | 204 | 12 | 40 | 1 | 1.3 | 97.5 |
| 9:45 | 213 | 8 | 40 | 2 | 1.1 | 98.3 |
| 10:50 | 211 | 8 | 39 | 3 | 0.7 | 99.0 |
| 11:15 | 213 | 8 | 39 | 4 | 0.3 | 98.1 |
| 12:00 | 215 | 8 | 32 | 5 | 0.4 | 99.1 |
| 12:20 | 215 | 8 | 31 | 6 | 0.2 | 99.3 |
| 1:05 | 217 | 8 | 31 | 7 | 1.7 | 98.0 |
| 2:10 | 215 | 8 | 30 | 8 | 0.7 | 98.9 |
| 3:00 | 216 | 8 | 30 | 9 | 1.0 | 98.5 |

*The balance not accounted for in the Diester & Monoester total percent comprises small amounts of a mixture of propylene glycol and free fatty acid.

During the entire distillation operation described above and for which data is presented in the table above, continuous steam sparging was conducted.

The purified propylene glycol monopalmitate prepared as described in this example is especially useful as an additive to liquid shortenings within the range of from 3 to 10 percent by weight to provide a clear oil shortening stable at refrigerator temperatures (40°–50° F).

What is claimed is:

1. A method of producing propylene glycol monoesters having a diester content of less than 3 percent, said method comprising vacuum distillation of propylene glycol monoester crude product at a distilling temperature of from 170° to 285° C, at an absolute pressure of less than 15 mm of mercury, wherein the condenser for the distillation apparatus is placed at a distance greater than the mean free path of the vapor molecules under reflux conditions.

2. The process of claim 1 wherein the absolute pressure is less than 10 mm. of mercury.

3. The process of claim 1 wherein the non-molecular vacuum distillation occurs for from 3 hours to 16 hours.

4. The process of claim 3 wherein the non-molecular vacuum distillation occurs for from 4 to 7 hours.

5. The process of claim 1 wherein said non-molecular vacuum distillation is conducted continuously with inert gas sparging.

6. The process of claim 1 wherein the propylene glycol monoester crude product contains propylene glycol monopalmitate and the distilling temperature is from 180° to 230° C.

7. The process of claim 1 wherein the propylene glycol monoester crude product contains propylene glycol monomyristate and the distilling temperature is from 170° to 220° C.

8. The process of claim 1 wherein the propylene glycol monoester crude product contains propylene glycol monostearate and the distilling temperature is from 190° to 250° C.

9. The process of claim 1 wherein the propylene glycol monoester crude product contains propylene glycol monobehenate and the distilling temperature is from 200° to 260° C.

10. The process of claim 1 wherein the propylene glycol monoester crude product contains propylene glycol monobrassidate and the distilling temperature is from 200° to 260° C.

* * * * *